United States Patent [19]

McNeill

[11] Patent Number: 5,175,500
[45] Date of Patent: Dec. 29, 1992

[54] METHOD AND APPARATUS FOR SURVEYING TERRAIN RESISTIVITY UTILIZING AVAILABLE VFL ELECTROMAGNETIC FIELDS

[75] Inventor: J. Duncan McNeill, Mississauga, Canada

[73] Assignee: Geonics Limited, Mississauga, Canada

[21] Appl. No.: 561,126

[22] Filed: Aug. 1, 1990

[51] Int. Cl.⁵ .................. G01V 3/08; G01V 3/165; G01V 3/38
[52] U.S. Cl. ................................. 324/334; 324/345
[58] Field of Search ............ 324/332, 334, 335, 344, 324/345, 347, 348, 349, 350, 351, 330

[56] References Cited

U.S. PATENT DOCUMENTS

| | | | |
|---|---|---|---|
| 3,500,175 | 3/1970 | Ronka | 324/334 |
| 3,521,153 | 7/1970 | Moss | 324/334 |
| 3,614,600 | 10/1971 | Ronka | 324/330 |
| 3,763,419 | 10/1973 | Barringer | 324/334 |
| 3,801,896 | 4/1974 | Duroux et al. | 324/334 |
| 3,852,659 | 12/1974 | Barringer | 324/334 |
| 3,866,111 | 2/1975 | Warren | 324/344 X |
| 3,936,728 | 2/1976 | Ghosh et al. | 324/335 |
| 3,950,695 | 4/1976 | Barringer | 324/334 |
| 3,986,207 | 10/1976 | Gerbel et al. | 324/350 X |
| 4,070,612 | 1/1978 | McNeill et al. | 324/334 |
| 4,199,720 | 4/1980 | McNeill | 324/334 |
| 4,523,148 | 6/1985 | Maciejewski | 324/351 |
| 4,591,791 | 5/1986 | Bostick | |
| 4,675,606 | 6/1987 | Ganguly | 324/345 X |
| 4,686,475 | 8/1987 | Kober et al. | 324/349 |
| 4,686,476 | 8/1987 | Ranganayaki | 324/350 |
| 4,825,165 | 4/1989 | Helms et al. | 324/348 |
| 4,841,250 | 6/1989 | Jackson | 324/349 |
| 4,939,460 | 7/1980 | Patla et al. | 324/350 X |

FOREIGN PATENT DOCUMENTS

| | | | |
|---|---|---|---|
| 678765 | 1/1964 | Canada | 324/334 |
| 937286 | 11/1973 | Canada . | |

OTHER PUBLICATIONS

IEEE Transactions on Geoscience & Remote Sensing, vol. GE-24, No. 2, Mar. 1986, pp. 198-203, 'Transient Response . . . ', Howard, Jr.
Proceedings of IGARRS Symposium, Ann Arbor, May 18-21, 1987, pp. 415-420, Okada, "Magnetism Quantites Measurement in Cast Iron Pipes . . . ".
Fraser, "Contouring of VLF-EM Data", Geophysics 34, pp. 958-967.
Karous & Hjelt, "Linear Filtering of VLF Dip-Angles", Geophysical Prospecting, 31, (1983), pp. 782-794.
Lankston & Hecker, "Enhancing VLF-EM Data Through Application of Frequency Domain Operators", Proc. 2nd National Outdoor Action Conference on Aquifer Restoration, etc., (1988), pp. 655-673.

Primary Examiner—Gerard R. Strecker
Assistant Examiner—Warren S. Edmonds

[57] ABSTRACT

Terrain resistivity is mapped by collecting data as to the vertical magnetic field ratio along a survey line by VLF survey techniques, and precision integrating rather than differentiating the data obtained. The received VLF signal is demodulated and low-pass filtered in a manner such as to preserve the DC component of the demodulated signal, and is then digitized and spatially integrated to obtain pseudo-resistivity readings along the survey line.

8 Claims, 7 Drawing Sheets

METHOD AND APPARATUS FOR SURVEYING TERRAIN RESISTIVITY UTILIZING AVAILABLE VFL ELECTROMAGNETIC FIELDS

BACKGROUND OF THE INVENTION

1. Field of the Invention

This invention relates to geophysical surveying, and more particularly to techniques for surveying terrain resistivity.

2. Review of the Art

Various techniques have been utilized for the detection of subsurface geological anomalies, characterised by different resistivity from surrounding terrain. One such technique relies upon the detection of secondary signals produced as a result of exposure of terrain being mapped to the coherent electromagnetic field produced by a distant VLF radio station. Some what analogous techniques utilize non-coherent sources such as naturally occurring magneto-telluric and audio frequency magneto-telluric electromagnetic fields.

Available VLF electro-magnetic fields have been used for over twenty years to map subsurface geology. In the one mode of implementation the horizontal (primary) VLF magnetic field component is used as a phase and amplitude reference against which to measure the normalized in-phase and quadrature phase components of the secondary vertical VLF magnetic field. In some cases the tilt angle (or tangent of the tilt angle, usually expressed as a percentage) and elipticity of the polarization ellipse is measured instead, but in the usual case where the anomalous or secondary VLF magnetic field components are relatively small compared with the primary field this measurement technique also yields quantities which are simply related to the in-phase and quadrature phase components of the vertical magnetic field.

In the early days of the VLF technique, survey interpretation was based on the assumption that, even in an electrically conductive earth, the time-varying primary VLF magnetic field induced vortex or eddy currents in vertical conductors. These vortex currents generated the secondary VLF magnetic field which was used to locate and characterise the conductor, using well established but flawed principles governing the ratio and phase of the secondary field components as functions of target size, depth and conductivity. Since only targets with appreciable vertical extent would be excited by the horizontal primary magnetic field the expected (and indeed measured) anomalies often took the form of a lateral S-curve with a zero-crossing. The location of the target was under the zero-crossing or, in the case where the response from nearby targets was also strong enough to contribute to the total response, the location was under the point of maximum inflection of the central limb of the curve.

Such multiple-target responses occur frequently and the resultant interference between the anomalies sometimes makes survey data interpretation quite difficult. In order to rectify this situation Fraser ("Contouring of VLF-EM data", Geophysics 34, page 958-967) proposed applying a simple numerical filter to the survey data which would simultaneously (1) numerically differentiate the data horizontally so as to transform the cross-overs into peaks, which could then be contoured.

(2) high-pass filter the data so as to attenuate the response from slowly varying anomalies and relatively enhance the response from localized anomalies.

(3) not emphasize random geological noise.

(4) be simple to apply for untrained field personnel.

The resultant "Fraser filter" has been widely used in VLF data processing. Examples of its application will be considered hereinafter.

More recently Karous and Hjelt ("Linear filtering of VLF dip-angle measurements", Geophysical Prospecting 31 (1983), pages 782-794) proposed a similar numerical filter, the output of which is interpreted in terms of the equivalent current density at a specified depth that would cause the measured VLF magnetic field strength. This filter also gives contourable anomaly peaks rather than cross-overs.

Finally Lankston and Hecker ("Enchancing VLF-EM data through application of frequency domain operators", Proc. 2nd National Outdoor Action Conference on Aquifer Restoration, Groundwater Monitoring and Geophysical Methods, Las Vegas (1988), pages 655-673) suggest use of the Hilbert transform to improve the geological signal-to-noise ratio over that achieved by the Fraser filter, but at the expense of greater mathematical complexity.

From the above it will be noted that use of numerical data processing (i.e. filtering) to enhance VLF data and simplify interpretation is a common practice.

SUMMARY OF THE INVENTION

I have found as a result of studies on the role of vortex currents in VLF responses that, contrary to general belief, it is the galvanic current component (also known as current gathering) that dominates the response from typical anomalies generated by VLF radio waves, at all but the highest background resistivities ($>5,000$ $\Omega$m). These VLF currents, which are generated by the horizontal electric field in the earth, flow in a horizontal direction radial to the transmitter. The distribution of this current flow, as it would occur in a uniform earth, is distorted by the presence of conductive (and resistive) anomalies, in turn causing an anomalous secondary magnetic field. Interestingly, the secondary VLF magnetic field due to galvanic current response from a vertical conductive plate aligned with its long axis pointing to the source is very much like that from the notional vortex current response already discussed above, since both vortex and galvanic responses arise principally from the enhanced VLF current flow in the top of the conductor. However the response from galvanic VLF current flow behaves very differently (compared with vortex current flow) as a function of target size, depth, conductivity contrast and dip, among other factors. Indeed a thin horizontal plate conductor will generate virtually no vortex current flow anomaly (being in null coupling with the horizontal primary magnetic field) whereas it can and does generate a large galvanic current flow anomaly.

Furthermore other geological features, such as a vertical contact, also generate a distinctive and measurable anomaly as a result of galvanic VLF current flow. The reason for this is that the variation of galvanic current flow with depth is determined entirely by skin depth considerations. At high values of terrain resistivity, the skin depth (defined as $\delta = (2/\mu\sigma w)^{\frac{1}{2}}$ where $\mu$ is a constant, $\sigma$ is the ground conductivity and $w$ is the angular frequency of the VLF source) is large, and current flows to relatively great depth, whereas at small terrain resistivity the skin depth is small and current flows only to a shallow depth. The galvanic current behaviour in the vicinity of a vertical contact between zones of different resistivity and the resultant magnetic field anomaly produce a response curve which, although there is no cross-over, is somewhat similar to part of the anomaly produced by a vertical conductive plate as discussed above. Furthermore the sharp anomaly decrease on the conductive side of the anomaly means that the differentiating action of the various filters described above creates an asymmetrical but large anomaly at the location of the contact which can easily be mistaken for the anomaly from a vertical plate. Despite the fact that the filtered anomaly from the contact has a different shape from that for the vertical plate (or other anomaly) it turns out in actual practice that the data from VLF surveys contain so many anomalies, of so many slightly different shapes, that it is often impossible, in either raw or filtered data sets, to further identify the source of the anomaly.

This has been a serious shortcoming of the VLF technique. What is required is a measured or derived quantity that is indicative of those variations of the resistivity of the ground which are causing the observed anomalies. Variations in the ground resistivity can presently be measured using VLF radio waves by inserting two electrodes in the ground, aligned so that the array axis is parallel to the direction to the transmitter, and measuring the VLF potential difference between these two electrodes as described by Collett and Becker in Canadian Patent No. 795,919. However this procedure is very time consuming and detracts from the most attractive feature of the measurement of the VLF magnetic field components, which is that no electrical contact with the ground is required and thus these measurements can be carried out very quickly and inexpensively.

I have adopted an alternative approach base upon my determination of the nature of the galvanic VLF current flow which is in actuality responsible for virtually all VLF anomalies. In this case the effective depth of the VLF current flow i.e. skin depth, will more or less continually reflect local resistivity, and a lateral change in resistivity will result in a change in depth of the current flow to accommodate the resulting change in skin depth. Any change in depth of the current flow in a direction perpendicular to that flow will result in a vertical component of the VLF magnetic field, the amplitude of which will vary according to the rate of change of terrain resistivity with distance.

According to the invention, a method of surveying the resistivity characteristics of terrain comprises measuring a series of values indicative of local relative magnitudes of a vertical VLF magnetic field component as compared to a horizontal VLF magnetic field component due to electromagnetic radiation at a particular frequency from a distant stationary VLF source whilst moving along a survey line generally perpendicular to the direction of the source, so as to provide data capable of providing a record of changes in said value along said survey line, and spatially integrating the data so obtained as to relative magnitudes of components at said particular frequency with respect to displacement along the survey line to provide a record indicative of the resistivity characteristics of the terrain along said survey line.

Values which may be measured include the ratio of the amplitude of the in-phase component of the vertical VLF magnetic field to the amplitude of the horizontal VLF magnetic field occasioned by radiation from the VLF source, the ratio of the amplitudes of the total vertical and horizontal VLF fields occasioned by radiation from the VLF source, and the tilt angle or tangent of the tilt angle of the ellipse of polarization of the VLF magnetic field occasioned by radiation from the VLF source.

The invention extends to apparatus for carrying out the above method.

Further features of the invention will be apparent from the following description with reference to the accompanying drawings.

SHORT DESCRIPTION OF THE DRAWINGS

FIG. 2 is a diagram corresponding to FIG. 1b, but illustrating the galvanic current flow which is in practice dominant in the vicinity of the buried conductive plate;

DESCRIPTION OF THE PREFERRED EMBODIMENTS

Figure 1A:
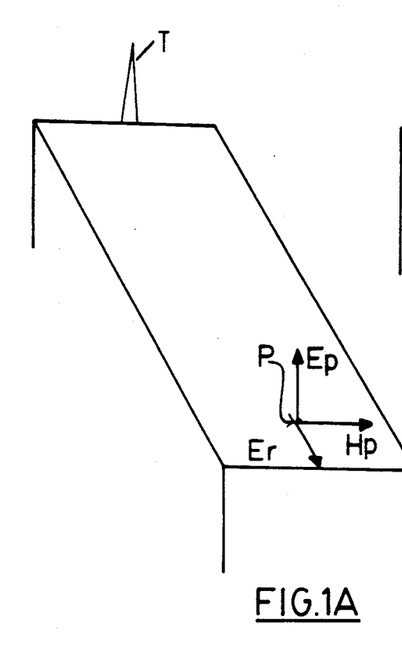
FIGS. 1a, 1b are diagrams illustrating traditional theory as to the generation of electric and magnetic fields by a distant VLF radio transmitter, along with flow of vortex currents within a radially oriented vertical plate conductor.
Figure 1B:
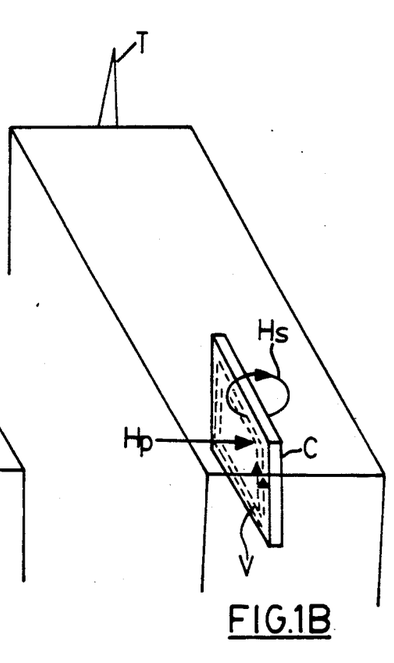
Figure 2A:
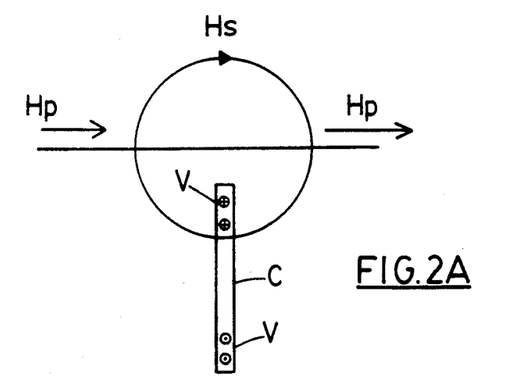
FIG. 2a is fragmentary section through an area of terrain further illustrating traditional theory as to VLF currents and fields in the vicinity of the conductor shown in FIG. 1, FIG. 2b illustrating the resulting vertical VLF magnetic field anomaly, and FIG. 2c illustrating how this anomaly may be distorted by an adjacent anomaly.
Figure 2B:
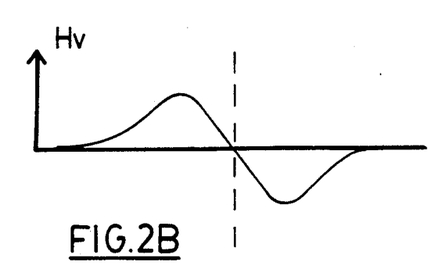
Figure 2C:
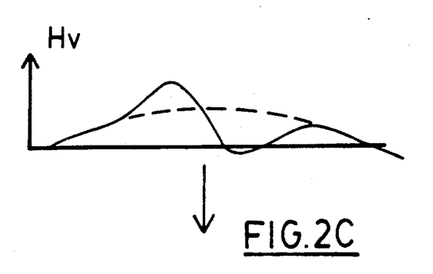

Referring to FIG. 1a, the primary VLF field components generated at a point P on a conductive half-space by a distant VLF transmitter T are vertical and radial electric field components $E_p$ and $E_r$, and a horizontal magnetic field component $H_p$. Assuming the presence at P of a subsurface radially and vertically extending conductive plate C (see FIGS. 1b and 2a) the component $H_p$ will induce a vortex current flow V in the plate which in turn will generate a secondary magnetic field $H_s$ which will have vertical components on either side of the plate, producing a vertical magnetic field anomaly as shown in FIG. 2b, which plots the vertical magnetic field component $H_v$ along the same section line as FIG. 2a. FIG. 2c illustrates how the curve of FIG. 2b may be distorted if the vertical field components generated by plate C overlap with those (shown in broken lines) produced as a result of another nearby conductive body.

Figures 3, 4A:
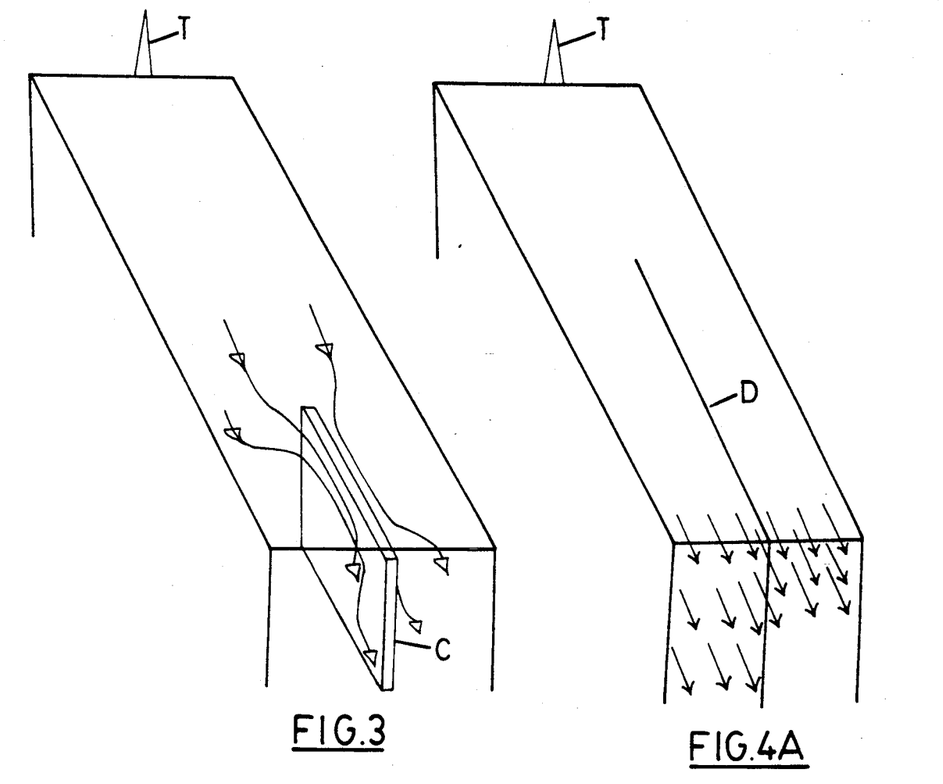
FIG. 4a is a diagram corresponding to FIG. 3, in which the conductive plate is replaced by a contact area between zones of resistive and conductive material.

In practice I have found that, except under conditions where large steeply dipping and highly conductive bodies are found in terrain of generally very high resistivity, the above discussed generation of vertical VLF field components due to vortex current flow is much less significant than the vertical VLF field components produced by distortions of the galvanic current flow through the terrain resulting from the radial electric field component $E_r$, as illustrated in FIG. 3, in which the presence of the conductor C causes a local reduction in skin depth and a 'bunching' effect as shown. As it happens, this bunching in the example shown produces a vertical VLF magnetic field anomaly very similar to that of FIG. 2b.

Figure 4B:
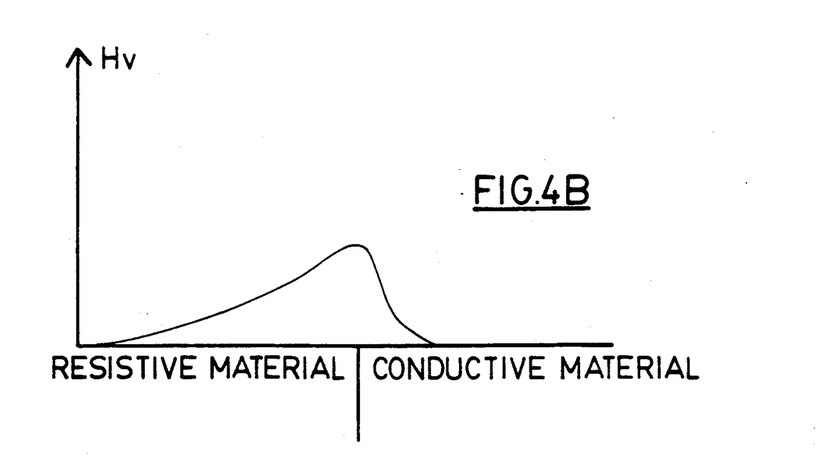
FIG. 4b illustrates the vertical magnetic field anomaly in the vicinity of the contact.

Considering now the feature shown in FIG. 4a, in which the plate C is replaced by a contact zone D between relatively resistive material (on the left) and relatively conductive material (on the right), the galvanic VLF current flow to the right of the contact will be concentrated nearer to the surface than that to the left of the contact. The distortion of the current flow near the contact zone produces a vertical field anomaly as shown in FIG. 4b, which in real life conditions could readily be confused with a distorted anomaly as shown in FIG. 2c.

Figure 5A:
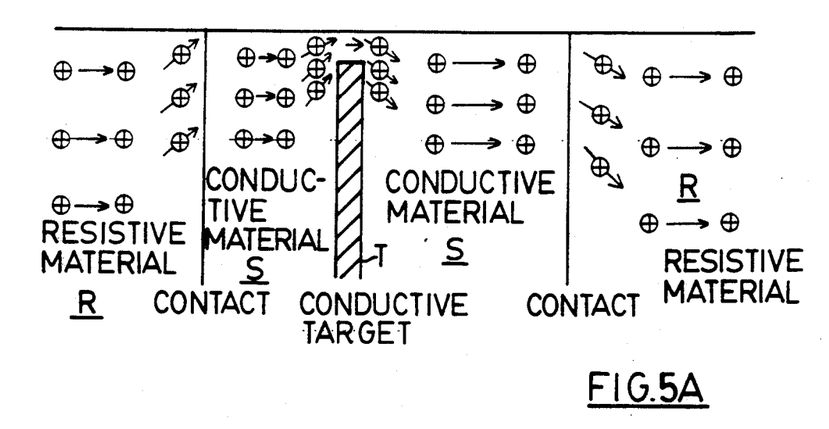
FIG. 5a is a vertical section through terrain containing various common subterranean features.
Figure 5B:
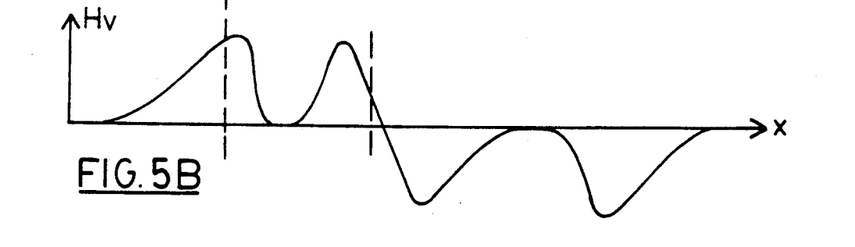
FIG. 5b illustrates the profile of the resulting vertical VLF magnetic field anomaly.
Figure 5C:
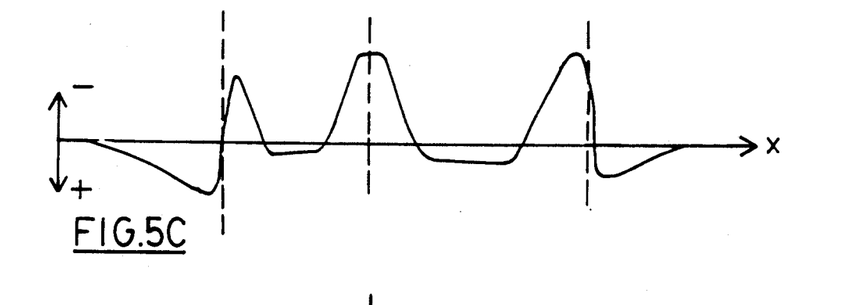
FIG. 5c illustrates the profile obtained by difference filtering the profile of FIG. 5b.

FIG. 5a shows schematically a section through an imaginary geological structure of somewhat greater complexity, in which, facing towards a distant VLF transmitter, a highly conductive vertical plate like target T is flanked by zones of moderately conductive material S which in turn contact zones of moderately resistive material R. The symbols ⊕ represent galvanic VLF currents passing into the page, whilst the arrows show the direction of the resulting VLF magnetic field. FIG. 5b plots the intensity of the vertical magnetic field component $H_v$, and FIG. 5c shows the effect of differencing this field component, the plot being inverted so that the response over the wanted conductor is upward. Neither plot provides any clear picture of the underlying structure.

Figure 5D:
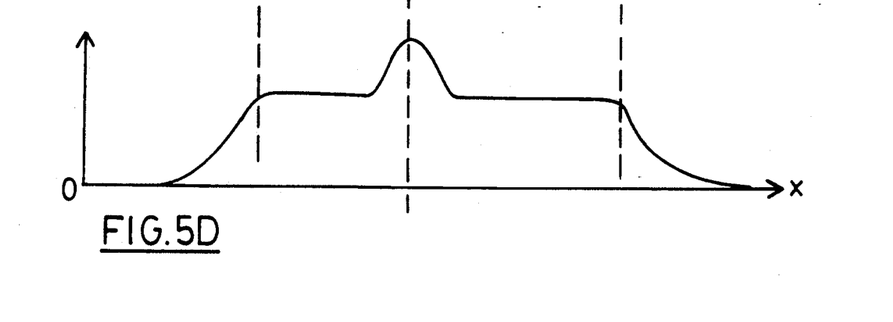
FIG. 5d is a profile illustrating the effect of continued spatial integration of the profile of FIG. 5b from left to right.

The effect of continually spatially integrating the vertical VLF magnetic field profile from left to right is shown schematically in FIG. 5d. The process of integration makes the presence of the two contacts, the presence of the enclosed block of conductive material, and the presence of the conductive target much more obvious; indeed the profile of FIG. 5d can be thought of as a profile of "pseudoconductivity" and as such is a useful supplement to the raw and filtered VLF data. The profile is not, of course, an actual conductivity profile since it is generated by the VLF magnetic field which is generated, in turn, by VLF currents whose varying depth is defined by the skin depth, which is a function of the square root of resistivity. However, it is much more useful than the difference filtered profile, shown in FIG. 5c, which yields no information about the background conductivity against which the anomalies are being detected and also makes correct identification of the source of any specific anomaly quite difficult.

Figure 6:
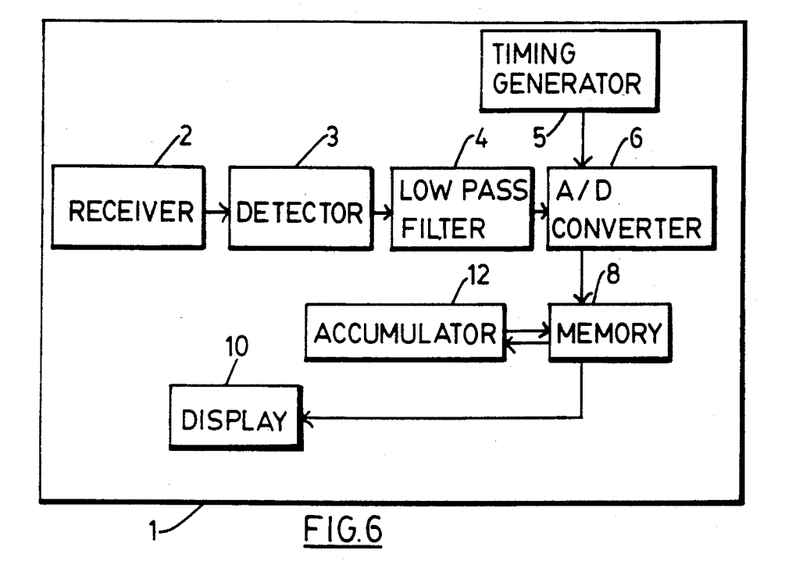
FIG. 6 is a block diagram illustrating apparatus for generating data forming a profile such as that shown in FIG. 5d.

FIG. 6 illustrates apparatus for generating such pseudo-conductivity profiles. A generally conventional VLF receiver 2 is configured and tuned to receive the vertical component of anomalous secondary VLF magnetic fields locally generated as a result of transmissions at the VLF frequency to which the receiver is turned from a distant VLF transmitter located approximately perpendicular to a survey line over which the receiver is conveyed. In a preferred embodiment only the relative magnitude of the in-phase vertical and horizontal components of this field is required, and the quadrature field can be ignored, thus simplifying the receiver, which may be constructed in accordance with established practice in the VLF survey art. Reference may if needed be had to Canadian Patent No. 937,286 (Ronka) for further description of such a receiver, although in the present case simplification may be, as stated, possible where only the real component of the vertical field is to be detected, In practice as discussed further below, the signal which is wanted is a value indicative of the relative VLF magnitude of the vertical magnetic field with respect to the horizontal VLF magnetic field in order to compensate for changes in the horizontal field.

As in the Ronka patent, the amplitudes of the vertical and horizontal VLF signals are detected by a detector means 3, which must be constructed so as to preserve the DC components, i.e. the representing the VLF carrier amplitude, stripped of noise and modulation of the demodulated signals, which are low pass filtered by filter means 4, conveniently effected using so-called integrator circuits which have a sufficiently long time constant to smooth out short term fluctuations in the output (such as those caused by modulation of the source transmitter) without obscuring terrain induced features of the signal profile which it is desired to examine. The filtered signals are combined by determining the magnitude of the vertical component as a fraction of the horizontal component, and the combined signal is passed to an analog-to-digital converter 6, having a sampling rate controlled by a timing generator producing signals related to increments of distance covered by a carrier 1, such as an aircraft, or portable instrument case, in which the receiver is carried along a survey line. If the carrier moves at a constant speed, the distance increments will be constant if the period between samples is constant. The sampling rate should be sufficient to permit the signal profile to be adequately resolved.

Rather than using an analog low pass filter, the sampling rate may be increased, and digital low pass filtering applied to produce a desired spectral content by summing groups of successive samples to provide samples with the required band-pass characteristics.

The resulting digital data is stored in a suitable memory device 8 for further processing. The data so stored may be subjected to further digital processing using similar algorithms to those discussed above in relation to prior art VLF techniques, to obtain digitized signal profiles which can be plotted or otherwise displayed by a display unit 10 in known manner to permit interpretation. Additionally or instead, successive samples are added in an accumulator 12 to obtain the left-to-right integration discussed above, the accumulator total after each addition being again stored in memory device 8 to build up a pseudo-conductivity profile which can be suitable scaled and plotted or displayed by display unit 10.

The data required for operation of the invention are values indicative of the relative magnitude of a vertical VLF field component $H_v$ as compared to the horizontal VLF magnetic field component $H_p$ produced by the VLF excitation. Examples of such values are the ratio of the in-phase vertical VLF field component $H_v(I)$ to $H_p$, the ratio of the total vertical field component $H_v$ to $H_p$, or the tilt angle or tangent of the tilt angle of the polarization ellipse of the field produced. Those values involving only in-phase components are preferred, particularly the ratio $H_v(I)/H_p$.

Assuming that data representing any of the above values is measured at a series of stations spaced along the survey line at an interval of $\Delta x$ meters, and that the value measured at station i in the series where $i \geq 0$ is Vi, all ratios being expressed as decimal fractions, then the result of integration is $$X(i) = X(i-1) + V(i) \cdot \Delta x \cdot R$$

where $X(-1)=0$, $X(i)$ is the spatially integrated value after station i, and R is an arbitrary constant or scale factor, and successive values for $X(i)$ are plotted at plot points $x = (i+0.5) \cdot \Delta x$. If the units of $\Delta x$ are meters, then a convenient value for R is unity, in which case the data can be expressed approximately in terms of "pseudo-conductivity" expressed in milliSiemens/meter (mS/m). The choice of R=1 (where $\Delta x$ is in meters) will usually result in the plotted values being of a similar order of magnitude to the actual conductivity. A notional example is shown in the following table:

TABLE 1

| i | xi = i.Δx | Vi | Vi.Δx | Xi | Plot Point (i + ½).Δx |
|---|---|---|---|---|---|
| 0 | 0 | 0 | 0 | 0 | 50 |
| 1 | 100 | 0 | 0 | 0 | 150 |
| 2 | 200 | 0.1 | 10 | 10 | 250 |
| 3 | 300 | 0.2 | 20 | 30 | 350 |
| 4 | 400 | 0.3 | 30 | 60 | 450 |
| 5 | 500 | 0.0 | 0 | 60 | 550 |
| 6 | 600 | −0.3 | −30 | 30 | 650 |
| 7 | 700 | −0.2 | −20 | 10 | 750 |
| 8 | 800 | −0.1 | −10 | 0 | 850 |
| 9 | 900 | 0.0 | 0 | 0 | 950 |

It should be appreciated that the apparatus used may be largely conventional, provided that it has the capability of receiving and separately detecting, preferably synchronously, the amplitudes of vertical and horizontal VLF field components. Detection using a synchronous demodulator is preferred in order to recover the amplitude of that vertical component which is in-phase with the horizontal component. The apparatus must of course be modified to include the integration function provided by accumulator 12. Thus the system must be able to preserve accurately the DC component (i.e. that due to the carrier rather than the modulation) of the amplitude profile of the vertical VLF magnetic field component, relative to the amplitude of the horizontal component, and the integration of the signal must also be achieved accurately and without drift. For this reason, it is preferred that the detected signal representing the relative vertical magnetic field ratio be digitized prior to integration, which is then performed numerically. It may be advantageous to utilize digital techniques to measure the carrier amplitude of the received VLF signal components and to perform any necessary low pass filtering required to exclude modulation and unwanted short term fluctuations in the signal. The demodulation and temporal integration technique disclosed in the FIG. 5 embodiment of the Ronka patent is not suitable, not only because the integration is temporal rather than spatial, but also because it is difficult to maintain sufficient DC stability for the purposes of the present invention in an analog integrator such as that disclosed by Ronka. Furthermore, the Ronka arrangement deliberately utilizes negative feedback to modify the DC level at the output of the integrator and thus in effect greatly reduces the direct current gain of the integrating amplifier. The integrating amplifier is thus caused to act as a bandpass filter which, whilst appropriate for recording data as to the amplitude of the vertical component, renders accurate integration impossible and essentially negates the function of the amplifier as anything other than a filter.

Figure 11:
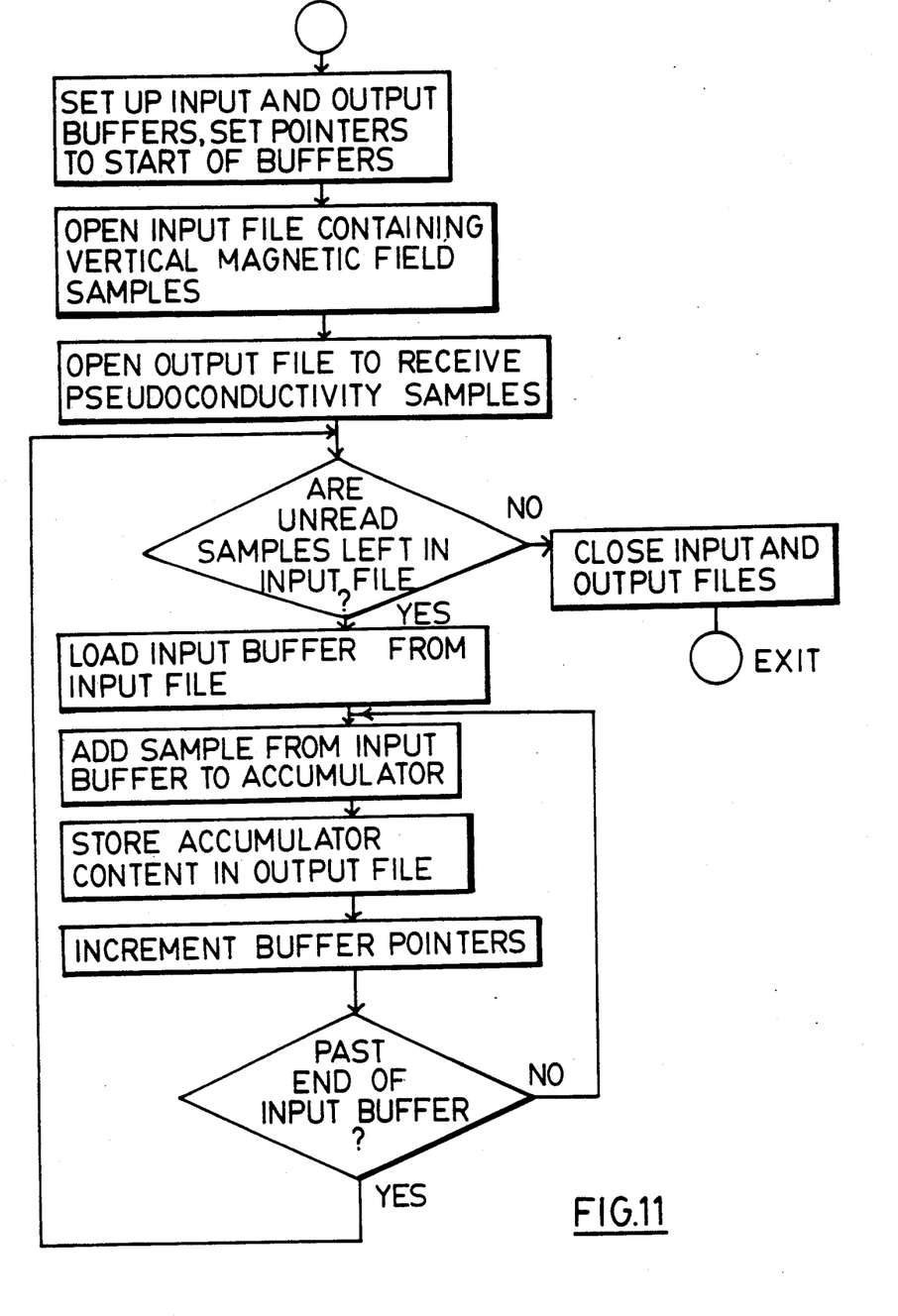
FIG. 11 is a flow diagram illustrating one possible implementation of the invention in microprocessor controlled VLF survey equipment.

Digital processing is advantageous since it facilitates accurate maintenance of DC levels. Furthermore, if signal processing is performed under microprocessor control, the required accumulation or precision integration step may be performed by a simple addition to the control program which program may include routines for performing optimal filtering techniques as well as the method of my invention. A flow diagram of an exemplary routine forms FIG. 11, and assumes that the samples from the digital to analog computer have been placed in a data storage file. The routine is self-explanatory, and results in the generation of a second file containing samples which represent a pseudoconductivity plot along the same survey, in the manner illustrated in Table 1.

Before proceeding to some theoretical and field examples further illustrating the invention, two points should be made. Since integration is achieved by adding the values of data taken at discrete measurement points which are separated by a fixed interval $\Delta x$, the value of the integral at any distance x will be a function of $1/\Delta x$, which is why the correction factor $\Delta x$ is found in the equation presented above. Further, the true zero level of the integrated data is not known. Whilst this is a disadvantage, the most significant information is presented by relative changes in the integrated signal along a survey line.

Figure 7A:
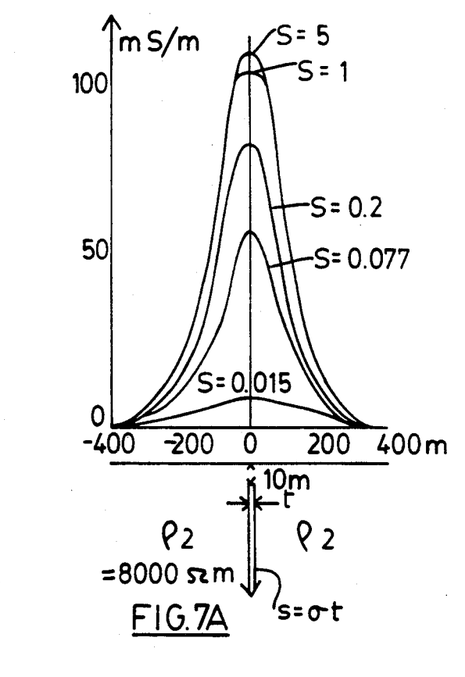
FIGS. 7a and 7b are families of curves illustrating the response obtained after, spatially integrating the vertical VLF magnetic field ratio along survey lines over an idealised vertical dike and an idealised vertical contact respectively.
Figure 7B:
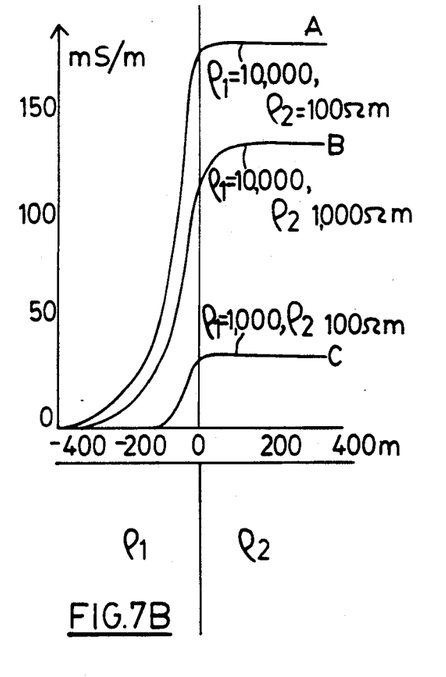

FIGS. 7a and 7b present results obtained from integrating the theoretical response from two important geological targets, viz a vertical sheet-like conductor (dike) (FIG. 7A) and a vertical contact (FIG. 7b). The curves were calculated from theoretical data giving the normal vertical in-phase VLF magnetic field resulting from two dimensional inhomogeneities oriented with their long axis parallel to the direction to the VLF transmitter.

Consider first a vertical dike, of thickness t, and conductance $S = \sigma t$, buried in a half space of resistivity $\rho_2$. The integrated response becomes a simple bell-shaped curve centered over the target, with maximum value a function of S and $\rho_2$, and with width proportional to $\rho_2^{\frac{1}{2}}$. For the extremely resistive half-space shown here ($\rho_2 = 8000$ $\Omega$m) the anomaly is quite wide (full width to half-maximum of about 300 m), but in the more typical case of $\rho_2 \sim 1000$ $\Omega$m the full width to half maximum value (FWHM) becomes about 100 m. Indeed it can be shown that, in general, the FWHM is approximately equal to the skin depth in the half-space. Furthermore the high value of $\rho_2$ also yields a high peak value of the integrated anomaly; reduction of the half space resistivity results in a substantial reduction of anomaly amplitude as well as anomaly width.

Similar results but for a contact between zones of resistivity $\rho_1$ and $\rho_2$ respectively are shown in FIG. 7b. The apparent conductivity increases as one traverses from the resistive to the conductive side of the contact by an amount which is a function of ratio $\rho_1/\rho_2$ and which saturates for large values of this ratio. Similar curves will apply for other values of $\rho_1/\rho_2$. The usual principles of electrical similitude apply. For example, the ratio $\rho_1/\rho_2$ for curve B is 10. If now $\rho_1 = 1000$ $\Omega$m and $\rho_2 = 100$ $\Omega$m ($\rho_1/\rho_2 = 10$ again), the new curve would look like curve (B) except that both the vertical and horizontal scales would be divided by $(10)^{\frac{1}{2}} = 3.2$. The anomaly will thus be smaller and more closely confined to the contact. Such an anomaly is shown by curve (C).

The responses from these two anomalies, viz a vertical conductive dike and a vertical contact, are useful in interpreting field survey results.

FIELD EXAMPLE 1

(Prakla Seismos—location not known)

Figures 8A, 8B:
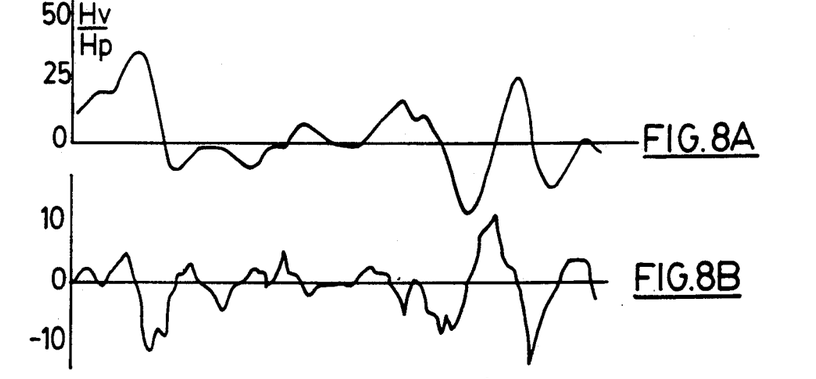
FIGS. 8a-8e illustrates the manipulation of actual VLF field survey data, FIG. 8a plotting collected VLF vertical magnetic field data, FIG. 8b showing the data horizontally differenced, FIG. 8c plotting a corresponding resistivity profile prepared from field collected resistivity data utilizing spaced electrodes, FIG. 8d illustrating the actual geology along the survey line, and FIG. 8e plotting the data of FIG. 8a spatially integrated along the survey line to simulate the operation of the method and apparatus of the invention.

The first case history is selected because it shows very well the relationship between VLF vertical magnetic field measurements, the integrated "pseudoconductivity" data calculated as described above, and terrain resistivity. FIG. 8a shows the vertical magnetic field component measured at 10 meter intervals along an 850 m survey line over the geology illustrated in FIG. 8d. FIG. 8b is the simple horizontal difference of the in-phase data extracted from the data shown in FIG. 8a. The reversal of polarity usually applied to the differenced data has not been carried out here since we wish to compare this panel with the resistivity data of FIG. 8c which is the result of Schlumberger resistivity profiling with half-current electrode spacing of 205 m and half-voltage electrode spacing of 5 m. The generally good correlation between lows in the differenced in-phase vertical magnetic field data and the Schlumberger apparent resistivity lows is immediately obvious.

Figure 8C:
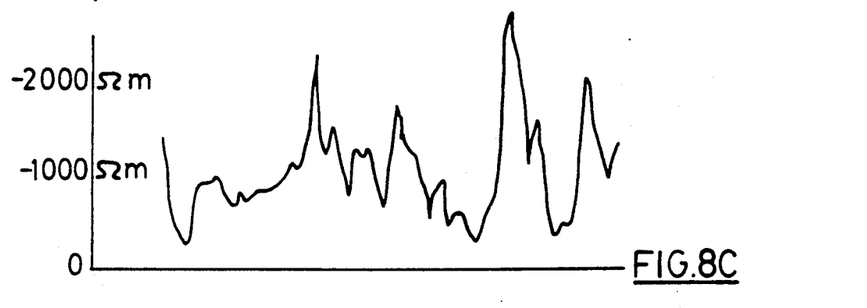
Figure 8D:
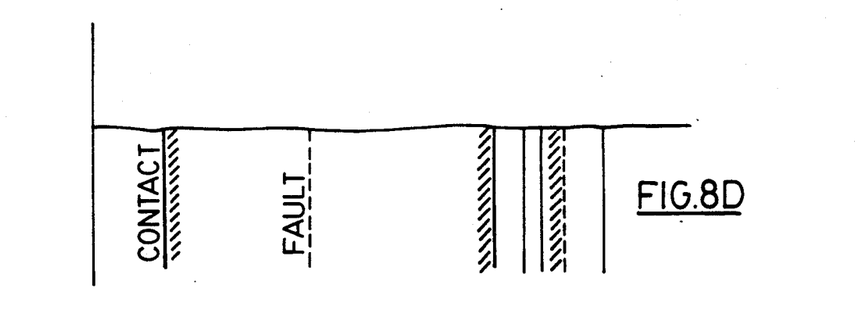
Figure 8E:
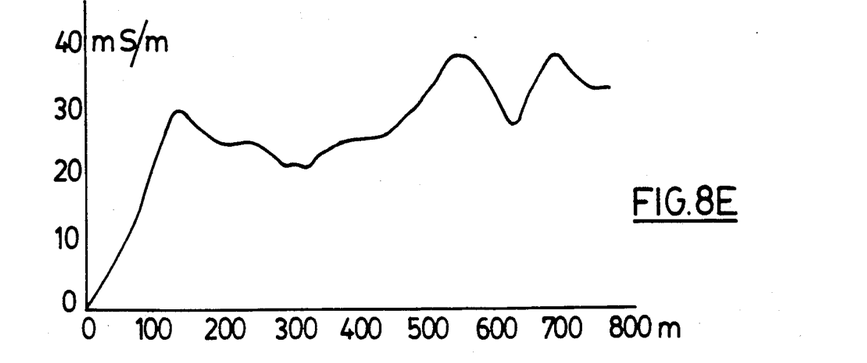

The results of spatially integrating the profile of FIG. 8a are shown in FIG. 8e. It is immediately apparent, by comparison with FIG. 7b, that there is a contact at the 110 m station, with resistive material to the left, conductive material to the right and about a 10/1 conductivity contact. The presence of this contact is completely missed by the raw and filtered data. In essence the data of FIG. 8b is that of FIG. 8e, doubly horizontally differentiated, which is exactly what it looks like. All the peaks of FIG. 8e are accentuated in FIG. 8b, but the all-important slowly varying component, which is related to the terrain conductivity, has been completely suppressed.

Comparing the resistivity curve shown in FIG. 8c with FIG. 8e, the low resistivity zones at stations 130, 220, 500–600 and 700 correspond extremely well to the pseudoconductivity highs at these same locations, and also the resistivity highs at stations 330, 460, 620 and 740 correspond well with the pseudoconductivity lows. Furthermore the pseudoconductivity trace of FIG. 8e depicts very clearly the fact that there is a contact with an adjacent conductor at the 110 m station, a fact which no interpreter would have picked from the raw or differenced VLF data.

FIELD EXAMPLE #2 (Niagara, N.Y.)

Figure 9:
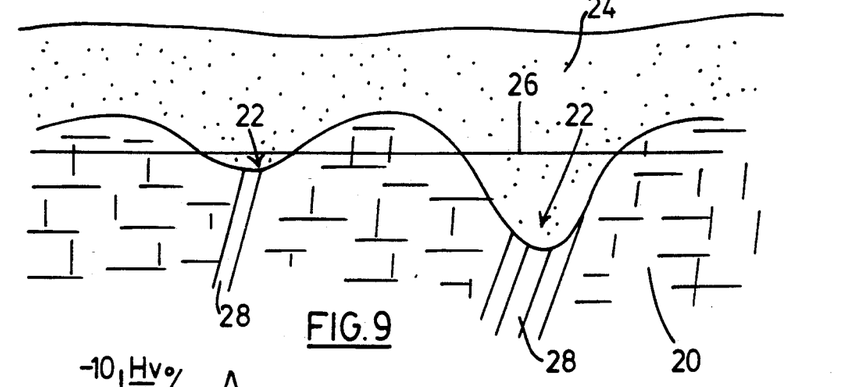
FIGS. 9 and 10a-10d illustrate a further example based on actual field survey data, FIG. 9 showing a geological section illustrative of the type of terrain surveyed, FIG. 10a being a plot of collected VLF vertical magnetic field data, FIG. 10b a plot of the data after Fraser filtering, FIG. 10c a plot of field surveyed conductivity data, and FIG. 10d a plot of spatially integrated VLF vertical magnetic field data along the survey line.

A typical geological section for the area surveyed in the second case history is shown in FIG. 9. Highly resistive dolomite bedrock 20 has at some time in the past been fractured, and the fractured zones 28 have subsequently been differentially weathered (the fracturing allows water to enter the rock and expand on freezing) to form bedrock topographic lows or troughs 22. More recently (post glacially) the bedrock surface has been covered by a lake with the result that electrically conductive lacustrine (lake) clays 24 have been deposited on the bedrock to an average thickness of 3–8 meters. Thus the geoelectric section consists of an electrically conductive layer of variable thickness overlying an electrically resistive bedrock; fracture zones will often exist in the bedrock at the base of the troughs and these fractures may be electrically conductive as a result of infilling with water, conductive clays or mineralization. A similar type of bedrock structure is particularly important in many countries for locating adequate sources of groundwater, in which case the interpreter wants to pick out those fracture zones which lie in the deepest troughs so that there will be maximum water available for pumping (see the line 26 indicating the level of the water table.)

Figures 10A, 10B:
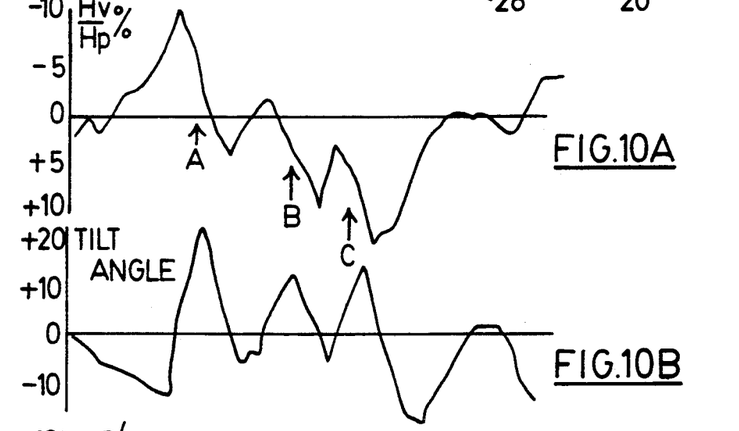

A VLF survey line was run over a geological section of this general type; survey results are shown in FIGS. 10a–10d. The survey line was 430 m long, and the raw VLF data shown in FIG. 10a indicates three conductors located at A, B and C respectively. These conductors were picked (as is customary when anomalies are so close together as to cause each other to be vertically off-set) by choosing the points of maximum inflection. FIG. 10b, which shows the Fraser filtered data, confirms this choice of conductors.

Figure 10C:
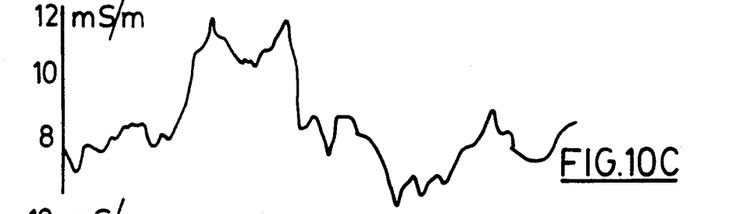
Figure 10D:
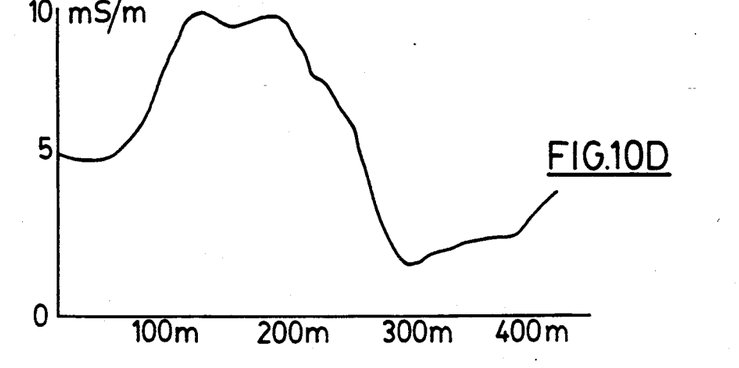

FIG. 10c shows results of an additional conductivity survey over the area using a Geonics (trademark) EM34-3 Ground Conductivity Meter, constructed in accordance with my U.S. Pat. No. 4,070,612. This survey profile shows a conductivity high located between stations 100 and 200. Since the clays are more conductive, this conductivity high corresponds to a thickening of the clay layer, i.e. to a depression or trough in the bedrock since the ground surface is virtually flat. Knowing that conductors A and B are located in the trough would make them the first priority drill targets for groundwater exploration. Target C, on the other hand, located on the flank of the trough, would be lower priority. Unfortunately, neither the raw or Fraser filtered VLF data gives the essential conductivity information to allow rational selection of any of the three conductors as having more groundwater potential than the others. On the other hand, the horizontally integrated VLF data, or pseudoconductivity, shown in the fourth panel, clearly shows that the conductors at stations 125 and 200 are located in a conductivity high or bedrock trough and that the conductor at station 260 is on the flank, completely confirming the results of the conductivity data, but without requiring the additional survey with a ground conductivity meter.

Whilst the invention has been described primarily with reference to the use of distant VLF radio transmitters as a VLF source, other naturally occurring or artificial sources of electromagnetic fields with frequency components in a similar or lower range may be exploited as is known in the art. Since these fields are typically non-coherent, the absolute magnitude of the vertical VLF field component must be determined in such a case. For the purpose of interpreting the appended claims, such a source should be considered to be within the term 'VLF source'. Moreover, instead of a receiver that resolves horizontal and vertical components of the magnetic field, a receiver that directly determines a function of the tilt angle such as the angle itself or its tangent, of the polarization ellipse of the field may be utilized; the tangent of this angle is proportional to the magnitude of the vertical component for small values of the latter.

I claim:

1. In a method of surveying the resistivity characteristics of terrain, comprising measuring a series of values indicative of local relative magnitudes of a vertical VLF magnetic field component as compared to a horizontal VLF magnetic field component due to electromagnetic radiation at a particular frequency from a preexisting distant stationary VLF source whilst moving along a survey line generally perpendicular to the source, the improvement comprising spatially integrating the series of values so obtained with respect to displacement along the survey line to provide a series of integrated values forming a record indicative of the resistivity characteristics of the terrain along said survey line.

2. A method according to claim 1, wherein the values detected are the ratio of the in-phase vertical to horizontal components of the magnetic field.

3. A method according to claim 1, wherein the values detected are a function of the tilt angle of the ellipse of polarization of the in-phase magnetic field.

4. A method according to claim 1, wherein samples of the relative magnitude of the vertical magnetic field data are digitized at substantially constant horizontal spatial intervals along the survey line, and the digitized samples are successively summed to provide said spatially integrated record.

5. In a method of surveying the resistivity characteristics of terrain subjected to a preexisting static pattern of ground currents of a VLF frequency, comprising determining at multiple spaced points along a survey line values indicative of the relative values of the vertical and horizontal components of a magnetic field associated with the ground currents, the improvement comprising spatially integrating the values obtained along said survey line to provide integrated values indicative of the resistivity characteristics of the terrain at multiple spaced points along the survey line.

6. In apparatus for surveying the resistivity characteristics of terrain, comprising a VLF receiver constructed to quantify the magnitude of a signal induced in the receiver by a vertical VLF magnetic field component due to electromagnetic radiation from a distant preexisting stationery source of a VLF frequency relative to a horizontal VLF component due to the same source, means to move the receiver along a survey line generally perpendicular to the direction of the source, means to detect said signal whilst preserving the DC component of the detected signal, and a low-pass filter receiving the detected signal and removing unwanted quickly changing source modulation, the improvement wherein the apparatus further comprises an analog-to-digital converter sampling said signal at substantially constant spatial intervals along said survey line, and producing digitized samples, and a digital spatial integrator receiving and summing said samples and outputting corresponding spatially integrated samples as a function of displacement along the survey line to provide a measure of terrain resistivity at each interval relative to the terrain resistivity at the beginning of the survey line.

7. Apparatus according to claim 6, wherein said receiver includes separate channels and means for synchronously demodulating signals induced by said horizontal and vertical field components, whereby to recover a vertical field component in-phase with the horizontal component.

8. A method according to claim 5 wherein the points are equally spaced, the data is spatially integrated by summing, and successive summations following each sample are output as integrated values providing a measure of terrain resistivity relative to the terrain resistivity at the beginning of the survey line.

* * * * *